US007684907B2

(12) United States Patent
Kopf et al.

(10) Patent No.: US 7,684,907 B2
(45) Date of Patent: Mar. 23, 2010

(54) DRIVER ASSISTANCE SYSTEM FOR A ROAD VEHICLE

(75) Inventors: Matthias Kopf, Munich (DE); Julien Simon, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 229 days.

(21) Appl. No.: 11/075,186

(22) Filed: Mar. 9, 2005

(65) Prior Publication Data
US 2005/0203685 A1 Sep. 15, 2005

Related U.S. Application Data

(63) Continuation of application No. PCT/EP03/07564, filed on Jul. 12, 2003.

(30) Foreign Application Priority Data
Sep. 10, 2002 (DE) ............................. 102 41 922

(51) Int. Cl.
*B60Q 1/00* (2006.01)
(52) U.S. Cl. ........................ 701/31; 701/36; 701/97; 340/438
(58) Field of Classification Search ............... 701/34, 701/39, 45, 48, 96, 301, 29, 31, 36, 43, 97; 340/438, 439, 903; 180/272, 275, 280
See application file for complete search history.

(56) References Cited

U.S. PATENT DOCUMENTS

| 4,829,434 | A | | 5/1989 | Karmel et al. |
| 5,633,642 | A | * | 5/1997 | Hoss et al. ..................... 342/70 |
| 5,765,116 | A | * | 6/1998 | Wilson-Jones et al. ........ 701/41 |
| 6,289,332 | B2 | * | 9/2001 | Menig et al. ..................... 707/1 |
| 6,411,901 | B1 | * | 6/2002 | Hiwatashi et al. ........... 701/301 |
| 6,909,947 | B2 | * | 6/2005 | Douros et al. ................. 701/29 |
| 6,941,215 | B2 | * | 9/2005 | Hellmann et al. ............. 701/93 |
| 7,102,496 | B1 | * | 9/2006 | Ernst et al. ................... 340/436 |
| 2002/0024444 | A1 | * | 2/2002 | Hiyama et al. .............. 340/576 |
| 2002/0121981 | A1 | * | 9/2002 | Munch ....................... 340/576 |

FOREIGN PATENT DOCUMENTS

| DE | 31 47 598 A1 | 8/1982 |
| DE | 196 37 210 A1 | 3/1998 |
| DE | 198 04 641 A1 | 8/1999 |

(Continued)

*Primary Examiner*—Khoi Tran
*Assistant Examiner*—Brian J Broadhead
(74) *Attorney, Agent, or Firm*—Crowell & Moring LLP

(57) ABSTRACT

The invention relates to a driver assistance system provided with an auxiliary system. The driver assistance system comprises detecting means for detecting information about a vehicle and influencing means for influencing a direction of movement and/or the speed of the vehicle according to information about said environment. The auxiliary system is used for issuing assistance information to the driver of the vehicle. The auxiliary system comprises recognition means for recognizing whether the driver assistance system can be operated in a reliable manner in a momentary environment state and/or in a future environment state and/or an operational state of the vehicle. The auxiliary system is connected to the recognition means and is embodied in such a manner that information can be given to the driver during operation of the vehicle if the driver assistance system cannot be operated in a reliable manner.

17 Claims, 1 Drawing Sheet

FOREIGN PATENT DOCUMENTS

| | | |
|---|---|---|
| DE | 198 21 163 A1 | 11/1999 |
| DE | 198 60 112 A1 | 7/2000 |
| DE | 199 19 216 A1 | 11/2000 |
| DE | 199 28 558 A1 | 1/2001 |
| DE | 100 06 351 A1 | 8/2001 |
| DE | 199 52 854 C1 | 8/2001 |
| DE | 199 52 857 C1 | 8/2001 |
| DE | 100 07 218 A1 | 9/2001 |
| DE | 100 25 492 A1 | 12/2001 |
| DE | 101 44 944 A1 | 4/2002 |
| EP | 1 182 089 A2 | 2/2002 |
| EP | 1 193 134 A2 | 4/2002 |
| GB | 2 371 031 | 7/2002 |

\* cited by examiner

DRIVER ASSISTANCE SYSTEM FOR A ROAD VEHICLE

CROSS-REFERENCE TO RELATED APPLICATIONS

This application is a continuation of PCT Application No. PCT/EP2003/007564 filed on Jul. 12, 2003, which claims priority to German Application No. 101 102 41 922.1 filed Sep. 10, 2002.

BACKGROUND AND SUMMARY OF THE INVENTION

The invention relates to a driver assistance system for a road vehicle, and a method for operating such a driver assistance system, whereby the driver assistance system captures environment information about a vehicle's environment; and a moving direction and/or a speed of the vehicle are influenced as a function of the environment information.

Such driver assistance systems are already known. Depending on the particular implementation, they fulfill various tasks, which otherwise are the sole responsibility of the driver. In one realization, pictures of the roadway in front of the driving car are taken by a camera and evaluated. Especially by means of roadway markings, which are in the middle, or at the edge of the roadway, information can be captured this way with respect to whether the vehicle is at a sufficient distance from the edge, the middle, and/or a lane delimitation of the roadway. The driver assistance system may then influence the traveling direction, if needed, for example, to make sure that the vehicle does not inadvertently leave a lane.

A further realization of a driver assistance system of the above-mentioned type is described in German patent document DE 198 04 641 A1: Depending on the distance to a vehicle driving ahead, the system influences the driving speed of the vehicle.

Driver assistance systems of the type mentioned at the beginning ease the strain on the driver, on the one hand by at least partially taking over the task of taking measures for conducting the vehicle by using information about the vehicle's environment. On the other hand, there are driving situations in which the driver assistance system may not be operated, or operated reliably, because the limits of an operating range, for which the driver assistance system was designed, are reached, or exceeded. If the driver does not observe the appropriate system limits and still relies on the system in these driving situations, traffic conflicts may be caused.

The present invention is based on providing a method and a driver assistance system of the above-mentioned type which allow for conflict-free application of the driver assistance system.

To meet these needs, the present invention outputs help information to the driver during the operation of the vehicle with respect to the driver assistance system in order to detect whether the driver assistance system may be reliably operated in an instantaneous, and/or in a future expected condition of the vehicle environment and/or operating condition.

"Operating reliably" as described above means that the driver assistance system is operated within an operating range for which it is designed. The corresponding system limits of the operating range, or the operating ranges may be at hand for various reasons. A sensor of the system may, for example, provide no or merely imprecise measuring signals within, or outside of a certain value range of the to be captured observation factor. Also, a further processing of the signals in certain operating situations of the vehicle (e.g. while the vehicle moves in dense traffic) may not be possible, or only in a restricted way, or may lead to unusable results for the driver assistance system. Furthermore, there are physical limits (e.g. temperature range) for the application of the system, and limits, or voids in the evaluability of an actual operating situation of the vehicle by the system. For example, the driver assistance system (see above) described in German patent document DE 198 04 641 A1 may not react to parked or standing vehicles, because there normally are a number of other non-moving objects apart from the parked or standing vehicles.

It is furthermore provided, that the driver assistance system consists of a help system for the output of help information to the driver of the vehicle, and that the driver assistance system consists of detection instruments for detecting whether the driver assistance system may be reliably operated in an instantaneous, and/or in a future expected condition of the environment and/or operating condition of the vehicle. The help system is connected with the detection instruments, and is designed to notify the driver during the operation of the vehicle when the driver assistance system cannot be operated reliably.

The present invention is based on the idea that it is becoming more and more difficult for drivers to learn the utilization and/or operation of the increasingly more complex driver assistance systems. Written operating instructions therefore become more and more extensive and complicated. It is also a know fact, that only few users read all the operating instructions, and/or remember all the important details during the utilization or operation. The safety is therefore enhanced, if help information regarding the correct usage and/or operation, especially about system limits during the operation of the vehicle are being output to the driver, and preferably at a time when an operating situation of the driver assistance system assigned to the relevant help information is imminent and/or has occurred.

A driver assistance system is, for example, designed to maintain a sufficient distance to the vehicle driving in front. The driver assistance system, however, only reacts to moving objects, and therefore cannot reliably keep a distance to standing, or very slow moving vehicles, i.e. it cannot stop the vehicle in time. If the speed of a vehicle driving in front falls to, or below, a preset limit value, a warning is output to the driver for this reason.

Preferably, the help information is at least partially output as acoustic and/or haptic signals, so that the attention of the driver to visual impressions of the environment of the vehicle is not impaired. A warning signal may, for example, be output to the driver in that at least a section of the steering wheel and/or the driver's seat outputs a haptic signal, e.g. in the form of a repeatedly interrupted vibration. Optionally, and/or in addition, an explanation of the situation may occur per voice output.

It is furthermore preferred to detect which driver is driving the vehicle, and to determine as a function thereof, whether and/or which help information is being output to the driver. Thereby, for example a differentiation can be made between an experienced user of the driver assistance system and a new user. Whereas the new user is still alerted to numerous operating situations of the driver assistance system, to the experienced driver at the most only minimal help information is provided. Thus, it can be prevented, that an advanced or experienced user is supplied with unnecessary information, and therefore pays no, or only little, attention to the help information that is output.

A possibility for differentiating users according to their different experience is to increase the value of a counter by one, each time a certain driver turns the driver assistance system on or off. It is, however, preferable, to record a history of help information already given to the driver, and to decide based on this history, whether and/or which help information is being given to the driver. As an alternative, or in addition, one or both of the following measures for determining the level of experience of a certain driver can be performed: a reaction of the driver to already output help information is evaluated, or a utilization of the driver assistance system and/or at least one other device of the vehicle by the driver is evaluated. Furthermore, for example, operating errors of the driver may be captured, and as a function thereof it may be decided whether and/or which help information should be output to the driver.

It seems expedient to output certain help information to the driver only a predetermined number of times, for example, two or three times. Thereafter, it can be assumed, that the driver does not need this information any longer. In a modification, in addition, or as an alternative, it may be taken into consideration how long it has been since certain help information was last given to the driver. If the last output goes back more than a predetermined period of time, the help information is given to this driver independent of, whether it was output previously on one or more occasions. It is also possible to make the output of certain help information a function of the period of time since the last output, and the number of past outputs.

By using biometric methods and/or by means of an object unmistakably allocated to a person it may, for example, be determined which driver is driving the vehicle.

BRIEF DESCRIPTION OF THE DRAWING

The invention is now further explained by means of embodiments. It is, however, not limited to the embodiments. The explanations refers to the enclosed drawing. The drawing shows in.

DETAILED DESCRIPTION OF THE DRAWING

Figure 1:
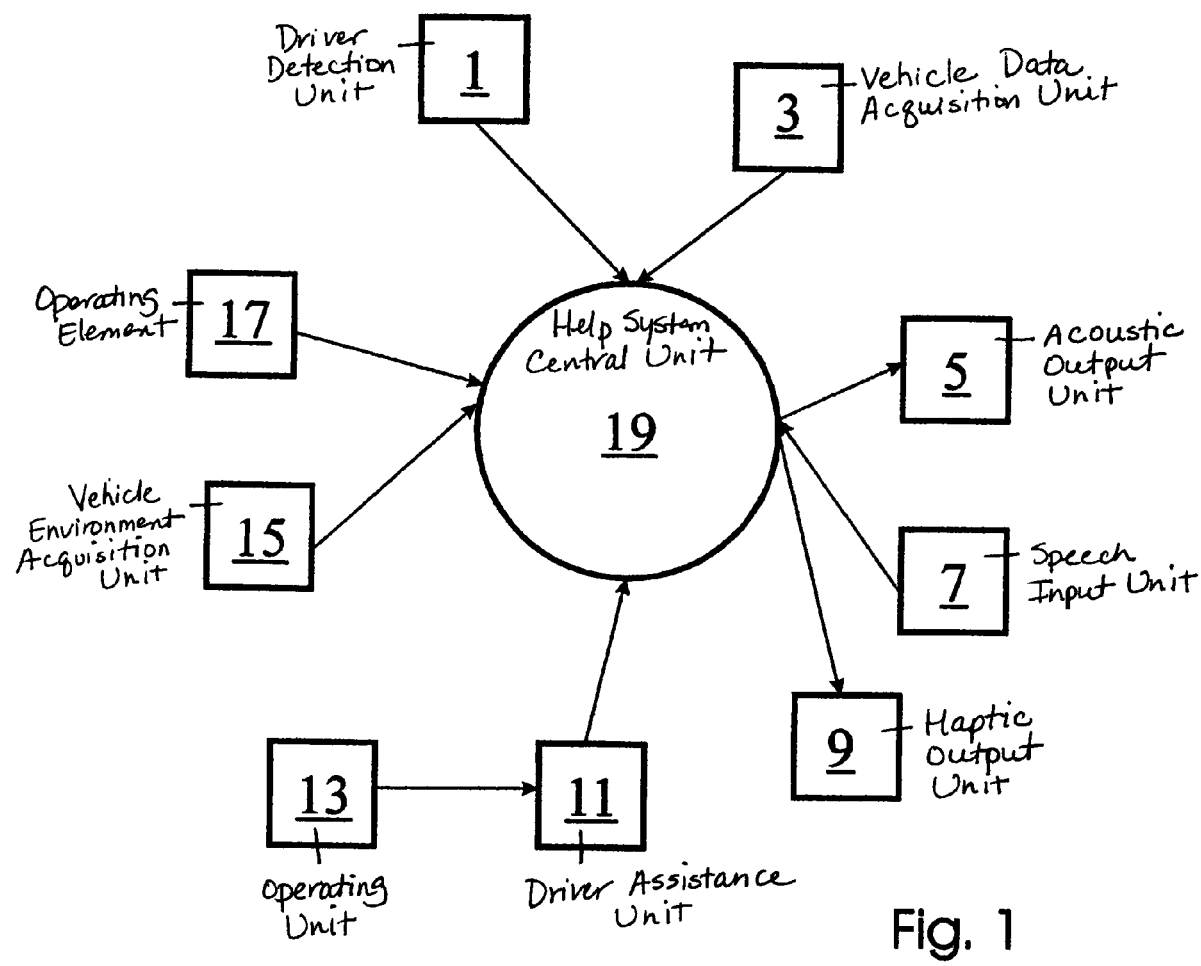
FIG. 1 a schematic depiction of a driver assistance system with help systems.

The driver assistance system is, for example, the Active Cruise Control (ACC)-system used by Bayerische Motoren Werke AG.

A central unit 19 of the help system consists of control devices for controlling the help system, detection instruments for detecting a current operating situation, and instruments for receiving, and for outputting signals from, or to, peripheral components 1 to 17. The control devices and the detection instruments are, for example, part of a micro-electronic computer, which may also perform functions aside from the help system.

The driver detection unit 1 provides the central unit 19 with information about the driver that is currently driving the vehicle. In the central unit 19, all data about all of the drivers who have driven the vehicle in the past is stored. If it is detected that the current driver is one of those drivers, the data assigned to the current driver is loaded. This data may especially contain information regarding the following: help information already output to the driver, past operating situations of the driver assistance system, or the vehicle, the driver's progress in learning to use the driver assistance system, the type of usage of the driver assistance system and other equipment of the vehicle by the driver, previous commands by the driver to the driver assistance system, and/or personal settings of the driver assistance system.

The central unit 19 determines, from the loaded data, which help mode is assigned to this driver. In a simple realization of the help system, there are two help modes. In the first help mode, i.e., the passive mode, help information is only output if requested by the driver. The current availability of a help function is signaled to the driver, for example acoustically via an output unit 5 and/or in haptic form via an output unit 9. Then, the help information may, for example, be requested by actuating an operating element 17 and/or by speaking specific words, such as "ACC help". The spoken words are recognized by means of a speech input unit 7.

In the second help mode, i.e., the active mode, the help information is automatically output when it is available in connection with a corresponding operating situation of the driver assistance system. Especially in the active mode, the output of the help information may be made a function of the fact of whether the output would put too much stress on the driver in a current traffic situation, or would present a danger especially in terms of distracting the driver from a critical traffic situation. Capturing of traffic situations is discussed below in more detail.

In other possible realizations of the help system, there are more than two help modes, in which help information is, for example, output in various forms (e.g. acoustically, haptically, and/or visually), and/or to various degrees.

A help mode suitable for the relevant driver may be set either automatically by evaluating the behavior of the driver, or set manually by the driver himself.

The central unit 19 receives information about relevant operating data of the vehicle, such as the driving speed, a current vehicle acceleration, a steering angle of a driving direction steering gear, and/or a brake pressure of a brake system of the vehicle via a vehicle data acquisition unit 3. In addition, the central unit 19 receives information about the environment of the vehicle, especially additional information, which is not necessary for the actual operation of the driver assistance system, from an environment data acquisition unit 15. This includes, for example, information regarding the current position of the vehicle, the type of road being currently driven, and/or the current weather.

Moreover, the central unit 19 receives from a driver assistance unit 11 the kind of information about the environment of the vehicle, which is necessary for the actual operation of the driver assistance system, for example information about traffic objects, their distance from the vehicle, their movement behavior, and/or about traffic signs. An operating unit 13 with operating elements of the driver assistance system is connected to the driver assistance unit, which performs the actual tasks of the driver assistance system.

From the information received from the units 3 and 15, as well as the driver assistance unit 11, the central unit 19 repeatedly determines a combined condition of the environment of the vehicle and the operating condition of the driver assistance system, and furthermore determines under consideration of the data of the current driver, whether help information will be offered to the driver and/or output to him. As needed, the output units 5, 9 may be used therefore.

The offered and output help information includes information with respect to reaching, or potentially reaching, system limits of the driver assistance system, but also general information regarding the operation of the driver assistance system.

Help information, especially of the following type, and/or the following form may be offered, and output:

If a driver turns on the driver assistance system for the first time, he receives an acoustic and/or visual (e.g. via a board monitor) introduction to the utilization of the driver assistance system. The driver may select between various help modes already at this stage.

If the driver assistance system is turned off automatically, because a system limit is reached, or exceeded, a notice to that effect is offered, or output, and/or a notice is output as to why the driver assistance system was turned off. The driver assistance system is, for example, a system, which influences the driving speed of the vehicle as a function of the speed of the vehicles driving ahead. If the speed of a vehicle driving ahead is lower than a predetermined limit value, the driver assistance system is turned off.

If the driver assistance system is operated in an operating range in which the risk of an error function is given, a corresponding warning signal is offered, or output. The already previously described driver assistance system, for example, reacts to slow-driving vehicles driving in front, however, not to vehicles as soon as they are at a stand-still. If it is determined that a vehicle driving in front drives slower than a predetermined limit value, the corresponding warning signal is offered, and output. In a variation, the warning signal is offered, or output, if reaching the system limit cannot be reliably determined metrologically, e.g. when the speed of the vehicle driving in front is in a range near zero, which when captured metrologically can only result in an imprecise value.

If it is determined, that the driver assistance system is used in conditions, especially in an environment condition for which it is not suitable, a corresponding notice is offered, or output. The driver assistance system may, for example, not be designed for application in cities with high traffic density.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a driver assistance system for a road vehicle, the method comprising the acts of:
   capturing environment information about an environment of the vehicle, the environment information including at least one of the current position of the vehicle, the type of road on which the vehicle is located, and the current weather in the location of the vehicle;
   outputting, during operation of the vehicle, help information regarding the driver assistance system to a driver of the vehicle;
   detecting, based on the captured environment information, whether the driver assistance system can be operated within a particular operating range in at least one of an instantaneous condition of the environment, future expected condition of the environment, instantaneous operating condition of the vehicle, and future expected condition of the vehicle; and
   notifying the driver via the help information if the driver assistance system cannot be operated within the particular operating range.

2. The method according to claim 1, wherein it is detected which driver is driving the vehicle, and it is decided as a function thereof at least one of whether help information is output to the driver and which help information is output to the driver.

3. The method according to claim 2, wherein it is decided based upon the history of help information already output to the driver thereof at least one of whether help information is output to the driver and which help information is output to the driver.

4. The method according to one of the claim 2, wherein a reaction of the driver to already output help information is evaluated, and wherein it is determined as a function thereof at least one of whether help information is output to the driver and which help information is output to the driver.

5. The method according to claim 2, wherein a usage of at least one of the driver assistance system and at least one other device of the vehicle by the driver is evaluated, and wherein it is determined as a function thereof at least one of whether help information is output to the driver and which help information is output to the driver.

6. The method according to claim 1, wherein it is decided based upon the history of help information already output to the driver thereof at least one of whether help information is output to the driver and which help information is output to the driver.

7. The method according to one of the claim 6, wherein a reaction of the driver to already output help information is evaluated, and wherein it is determined as a function thereof at least one of whether help information is output to the driver and which help information is output to the driver.

8. The method according to claim 6, wherein a usage of at least one of the driver assistance system and at least one other device of the vehicle by the driver is evaluated, and wherein it is determined as a function thereof at least one of whether help information is output to the driver and which help information is output to the driver.

9. The method according to one of the claim 1, wherein a reaction of the driver to already output help information is evaluated, and wherein it is determined as a function thereof at least one of whether help information is output to the driver and which help information is output to the driver.

10. The method according to claim 9, wherein a usage of at least one of the driver assistance system and at least one other device of the vehicle by the driver is evaluated, and wherein it is determined as a function thereof at least one of whether help information is output to the driver and which help information is output to the driver.

11. The method according to claim 1, wherein a usage of at least one of the driver assistance system and at least one other device of the vehicle by the driver is evaluated, and wherein it is determined as a function thereof at least one of whether help information is output to the driver and which help information is output to the driver.

12. The method according to claim 1, wherein at least one of a moving direction and a speed of the vehicle are influenced as a function of the environment information.

13. The method of claim 1, wherein the detecting is based on the captured environment information and an operating condition of the vehicle.

14. The method according to claim 1, further comprising the acts of:
    determining whether a predetermined limit is reached; and
    automatically turning off the driver assistance system when the predetermined limit is reached.

15. The method according to claim 14, wherein the predetermined limit is a minimum speed of another vehicle located in front of the road vehicle.

16. A driver assistance system for a road vehicle, the driver assistance system comprising:
- an acquisition device for capturing environment information about an environment of the vehicle, the environment information including at least one of the current position of the vehicle, the type of road on which the vehicle is located, and the current weather in the location of the vehicle;
- a help system for the output of help information to the driver of the vehicle; and
- detection instruments for detecting, based on the captured environment information, whether the driver assistance system can be operated within a particular operating range in at least one of an instantaneous condition of the environment, future expected condition of the environment, instantaneous operating condition of the vehicle, and future expected condition of the vehicle, wherein the help system is connected with the detection instruments, and is designed to notify the driver during an operation of the vehicle if the driver assistance system cannot be operated within the particular operating range.

17. The driver assistance system according to claim 16, further comprising an influencing unit for influencing at least one of a movement direction and a speed of the vehicle as a function of the environment information.

* * * * *